J. M. CAGE.
INTERNAL COMBUSTION ENGINE.
APPLICATION FILED JUNE 7, 1917.

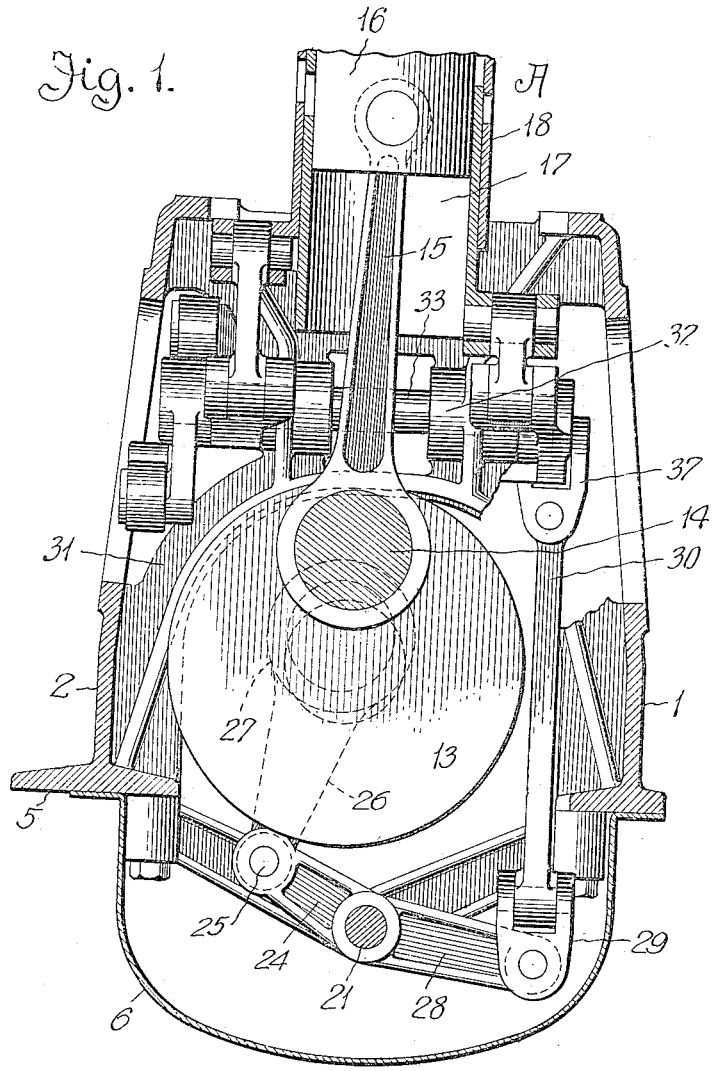

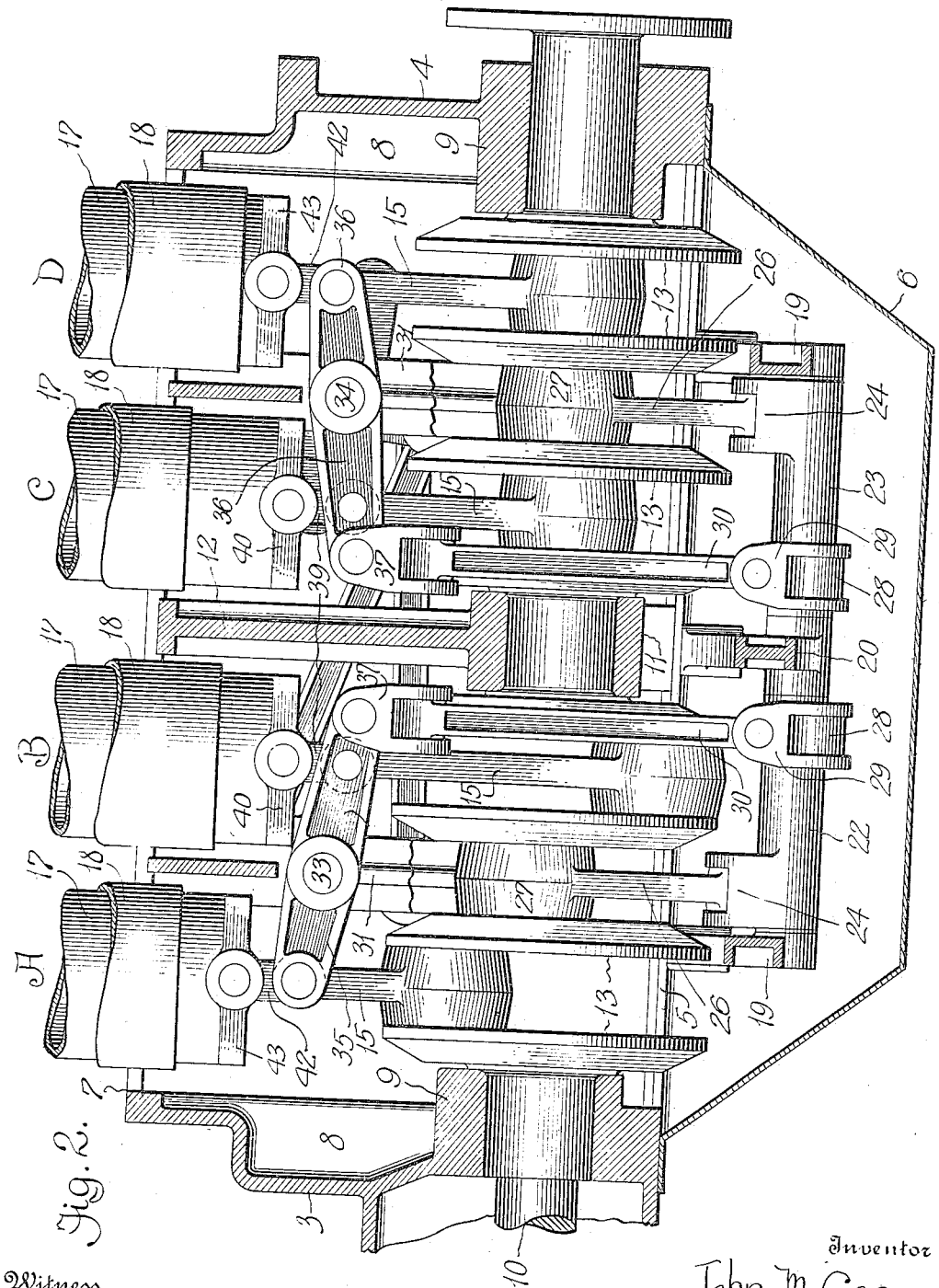

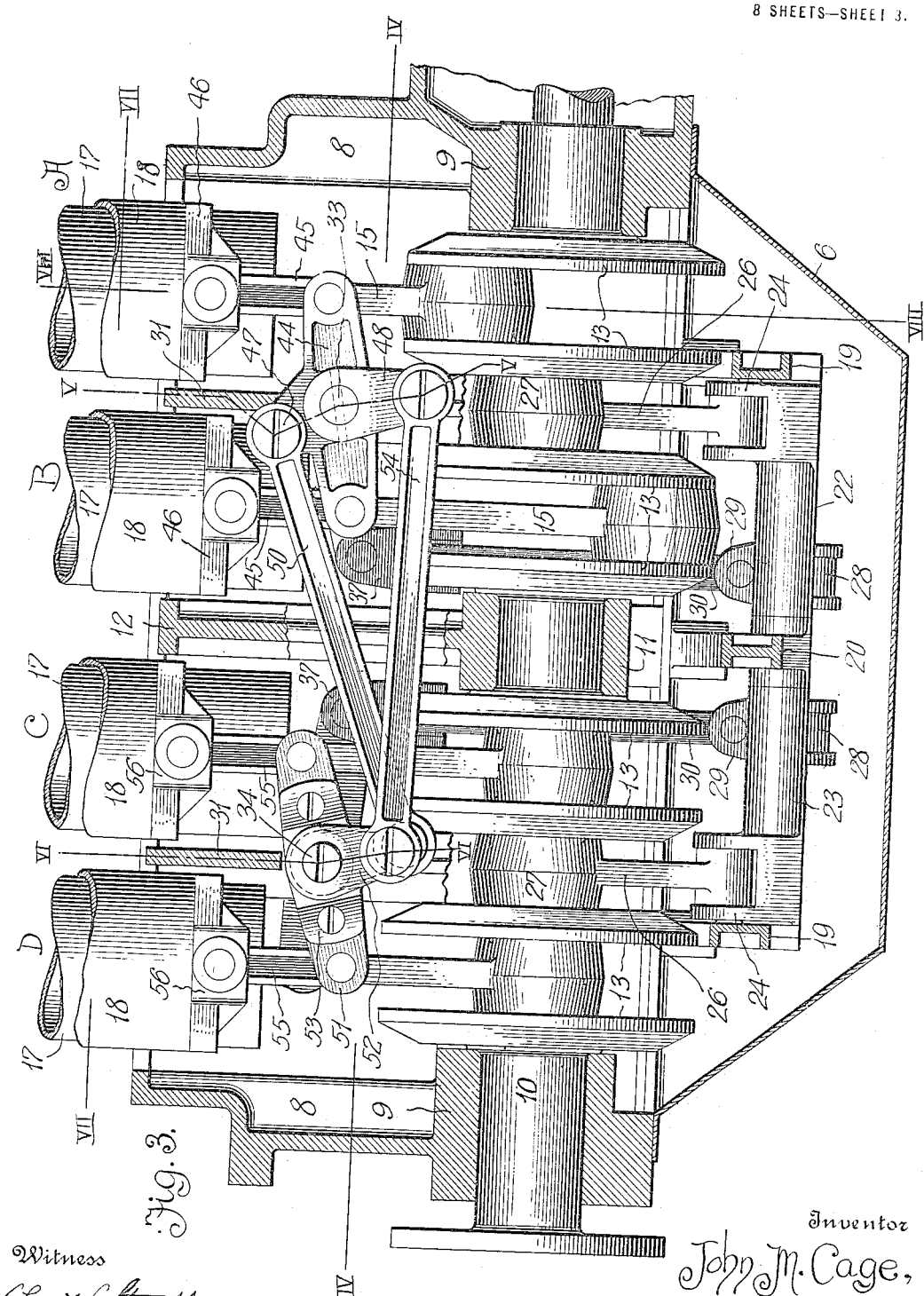

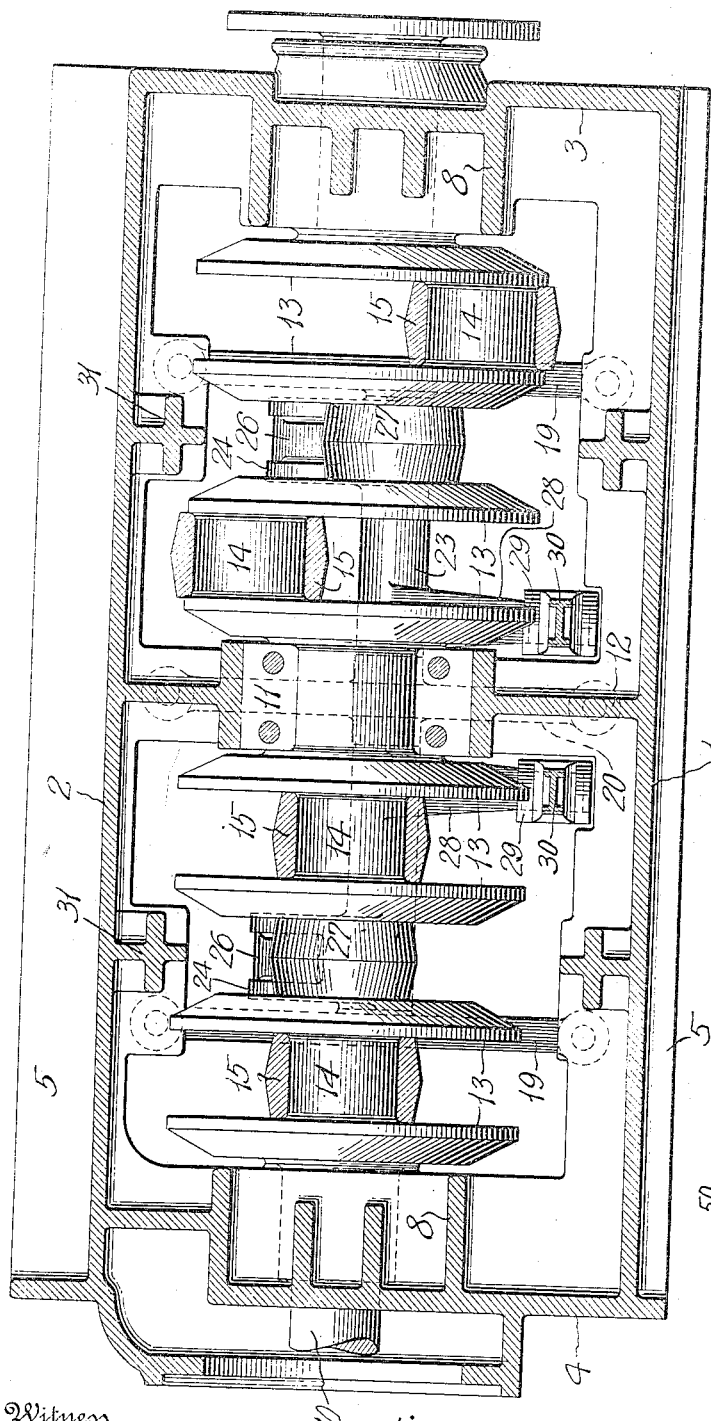

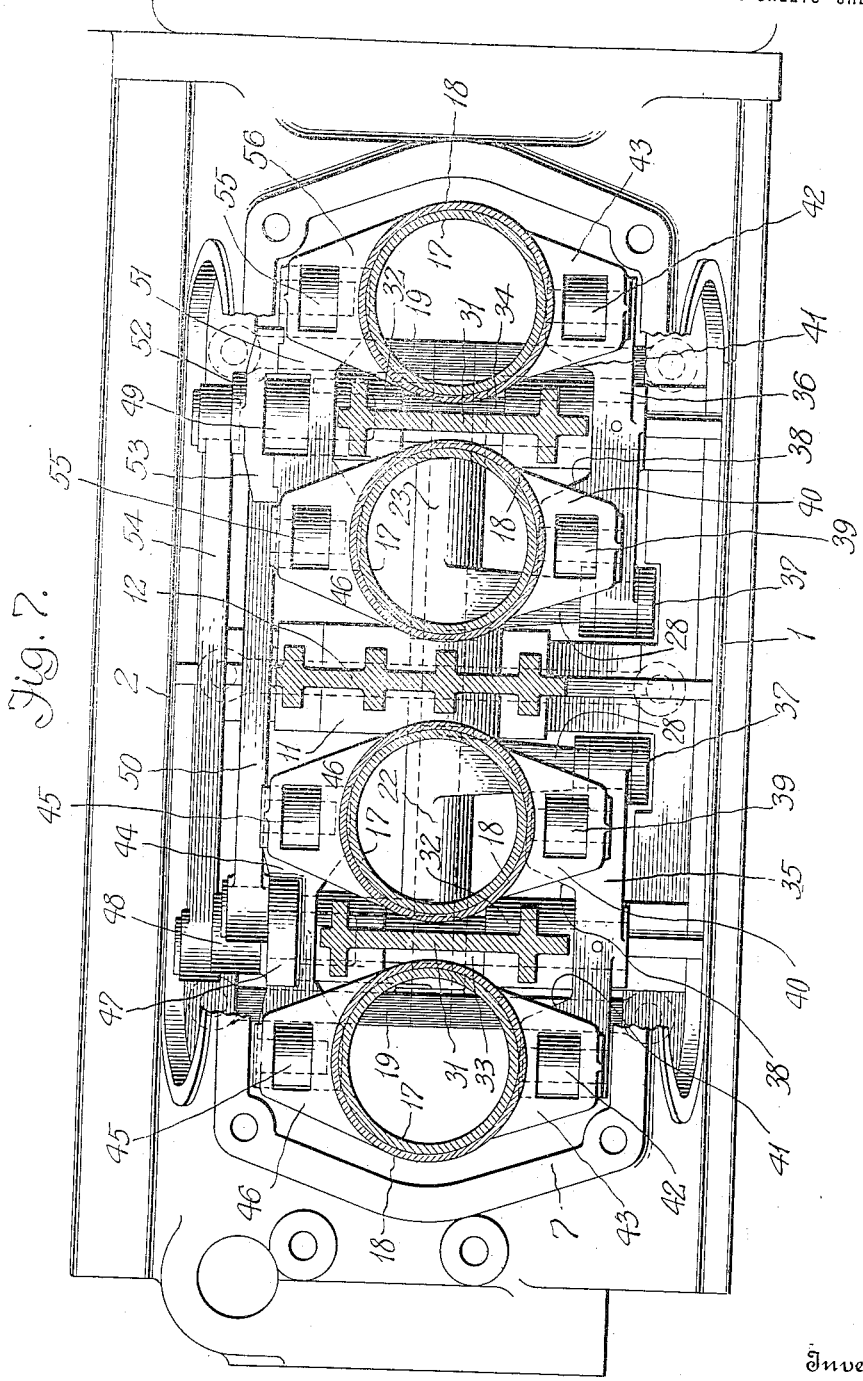

1,294,395.

Patented Feb. 18, 1919.
8 SHEETS—SHEET 6.

Fig. 8.

Witness
Chas. W. Stauffiger
Karl H. Butler

Inventor
John M. Cage,
By [signature]
Attorneys

J. M. CAGE.
INTERNAL COMBUSTION ENGINE.
APPLICATION FILED JUNE 7, 1917.

1,294,395.

Patented Feb. 18, 1919.
8 SHEETS—SHEET 8.

Inventor
John M Cage,

Witness
Chas. W. Stauffiger
Karl H. Butler

By
Attorneys

UNITED STATES PATENT OFFICE.

JOHN M. CAGE, OF DETROIT, MICHIGAN, ASSIGNOR TO CAGE ENGINE SYNDICATE INC., A CORPORATION OF DELAWARE.

INTERNAL-COMBUSTION ENGINE.

1,294,395.   Specification of Letters Patent.   Patented Feb. 18, 1919.

Application filed June 7, 1917. Serial No. 173,408.

*To all whom it may concern:*

Be it known that I, JOHN M. CAGE, a citizen of the United States of America, residing at Detroit, in the county of Wayne and State of Michigan, have invented certain new and useful Improvements in Internal-Combustion Engines, of which the following is a specification, reference being had therein to the accompanying drawings.
Some engines have ported cylinder casings, ported work cylinders therein, and ported sleeve valves between the ported work cylinders and the ported cylinder casing, so that when the cylinders and valves are reciprocated in synchronism or one independent of the other, fluids or liquids may be admitted and exhausted to and from the work cylinders.

Such an engine is disclosed in my application for patent filed July 27, 1914, Serial No. 845,367, and now known as a "six-stroke three-phase engine", and as a further example of telescopic parts of an engine, there is shown in my companion application, filed under even date S. N. 173,409, a two-cycle engine, which may be considered an improvement of those previously designed by me. With this type of engine some provision must be made for reciprocating the work cylinder and the sleeve valve in timed relation so that certain ports thereof will register at predetermined times for the admission and exhaust of liquid or fluid to and from the work cylinders. It is also essential that the cylinders and valves be operated in timed relation to the reciprocation of a piston or pistons within the work cylinders and this invention particularly relates to a cylinder and valve operating mechanism by which the work cylinder and sleeve valve may be moved in accordance with the firing order of the engine.

My present invention aims to provide cylinder and valve operating mechanism that can be compactly assembled within the crank case of an engine, and automatically actuated by the crank shaft of the engine. The cylinder and valve operating mechanism is preferably balanced in the engine crank case and articulated relatively to the work cylinders and sleeve valves thereof so that the cylinders and valves may be easily shifted with a minimum vibration in the crank case; the gearing or operating mechanism tending to more perfectly balance the crank shaft, thus insuring smooth running of an engine in accordance with my invention.

My present invention will be hereinafter more fully considered, and reference will now be had to the drawings, wherein—

Figure 1 is a vertical cross sectional view of a portion of a two-cycle engine, showing the work cylinder and sleeve valve gearing mechanism within the crank case and its articulation with the crank shaft of the engine;

Fig. 2 is a central longitudinal sectional view of the crank case of the engine showing one side of the cylinder and valve gearing mechanism;

Fig. 3 is a similar view of the crank case showing the opposite side of the cylinder and valve gearing mechanism;

Fig. 4 is a horizontal sectional view taken on the line IV—IV of Fig. 3;

Fig. 5 is a detail sectional view taken on the line V—V of Fig. 3;

Fig. 6 is a similar view taken on the line VI—VI of Fig. 3;

Fig. 7 is a horizontal sectional view taken on the line VII—VII of Fig. 3;

Fig. 8 is a diagrammatic view of the cylinder and valve gearing mechanism;

Figure 9:
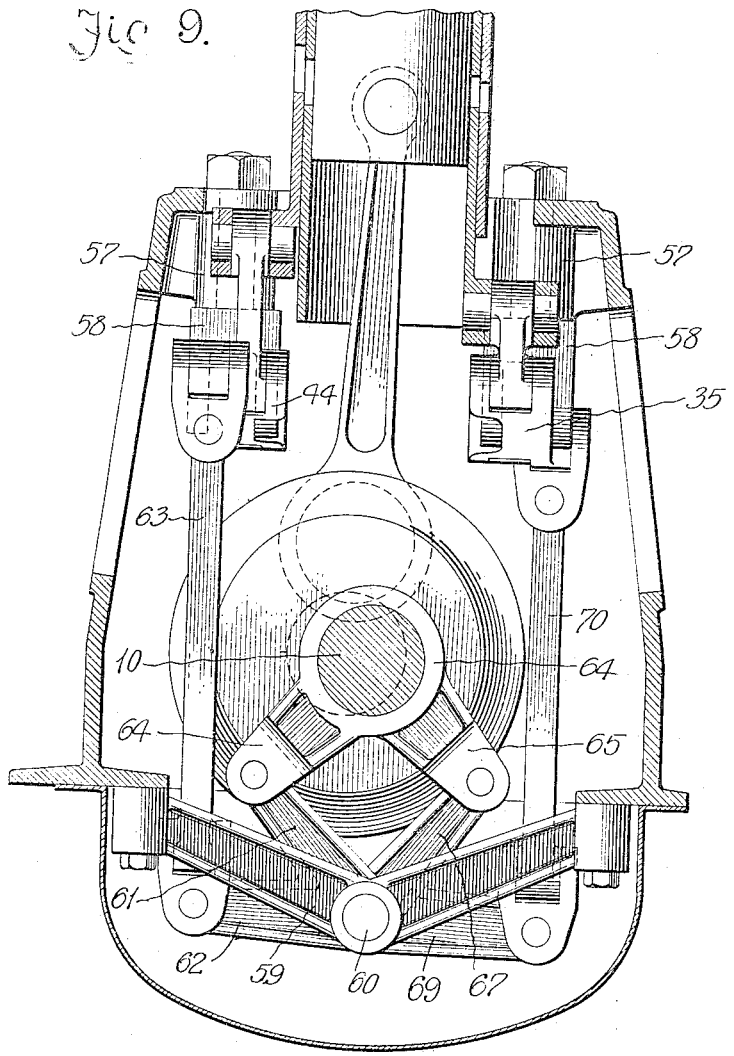
Fig. 9 is a view similar to Fig. 1, showing a modified form of operating mechanism.

In describing my invention by aid of the views above referred to, I desire to point out that the same are merely illustrative of the cylinder and valve gearing mechanism as now embodied in a two-cycle engine, and I do not care to confine myself to the precise construction and arrangement of parts. The following description is therefore to be broadly construed as including such substitute constructions and arrangement of parts which are the obvious equivalents of those to be hereinafter referred to.

In the drawings, there is illustrated the lower portion of an engine in accordance with my invention, and the reference numerals 1 and 2 denote the longitudinal side walls of a crank case and said walls are connected by end walls 3 and 4, with all of said walls having a substantial base 5. The base 5 provides openings in communication with a pan 6, suitably connected thereto, and the top of the crank case has an oblong opening 7 over which is mounted a cylinder casing or block, (not shown).

The inner sides of the end walls 3 and 4 are reinforced by vertical ribs and webs 8 connected to bearings 9 for an engine crank shaft 10. This shaft, intermediate the ends thereof, is journaled in another bearing 11 forming part of a transverse ribbed or stiffened partition 12 connecting the walls 1 and 2 of the crank case.

The crank shaft 10 has sets of concentric heads 13 connected by eccentric wrist pins or crank portions 14 for connecting rods 15. The connecting rods 15 are operatively connected to pistons 16 reciprocable in work cylinders 17 surrounded by sleeve valves 18 the last three mentioned elements being partially shown in the opening 7 in order that the valve gearing mechanism actuated by the crank shaft 10 may be articulated with the ported work cylinders 17 and ported valve sleeves 18. For a further understanding of the operation of the elements 17 and 18, it is necessary to refer to the same as units A, B, C, and D of the engine, as all of the units are articulated to a certain extent so as to be actuated in timed relation.

The base 5 is provided with stirrups 19 and 20 extending into the pan 6 and these stirrups support a longitudinal shaft 21 for rock sleeves 22 and 23. These rock sleeves have the ends thereof, adjacent the stirrups 19, provided with short cranks 24 pivotally connected as at 25, to the arms 26 of eccentrics 27 on the crank shaft 10, between the sets of heads 13 of said shaft. The inner ends of the rock sleeves 22 and 23, contiguous to the stirrup 20, have cranks 28, pivotally connected to coupling members 29 for pitmen 30, said pitmen extending upwardly at the inner side of the wall 1, at the sides of the central partition 12.

The crank case is provided with frames 31 connecting the side walls 1 and 2, and the base 5, said frames extending to the top of the crank case above the eccentrics 27 of the crank shaft 10. The frames 31 have transversely alining bearings 32 for rock shafts 33 and 34. On said shafts, adjacent the side wall 1 of the crank case, are beams 35 and 36, respectively, and these beams have the confronting ends thereof connected by coupling members 37 to the upper ends of the pitmen 30. The beams 35 and 36 have the inner ends thereof provided with offset portions 38 pivotally connected by links 39 to lateral side extensions 40 on the lower ends of the working cylinders 17 of the units B and C. The outer ends of the beams 35 and 36 have offset portions 41 pivotally connected by links 42 to side extensions 43 on the lower ends of the working cylinders 17 of the units A and D. So far, it is apparent that when the beams 35 and 36 are rocked through the medium of the pitmen 30, that the work cylinders 17 of units A and D are reciprocated in a reverse direction relatively to the work cylinders 17 of the units B and C.

On the end of the rock shaft 33, adjacent the side wall 2 of the crank case, is a loose beam 44 and the ends of said beam are pivotally connected by links 45 to lateral side extensions 46 of the sleeve valves 18 of the units A and B. The beam 44 has the upper edge thereof provided with a wrist pin 47, and fixed on the end of the rock shaft 33 is a crank 48.

Fixed on the end of the rock shaft 34 adjacent the side wall 2 of the crank case is a crank 49 pivotally connected by a link 50 to the wrist pin 47 of the loose beam 44, so that a rocking movement of the shaft 34 imparts a similar movement to the beam 44 which reciprocates the sleeve valves 18 of the units A and B. Loose on the same end of the rock shaft 34 is a beam 51 and a crank 52, the latter having side lugs 53 connected to the beam 51. The crank 52 is pivotally connected by a link 54 to the crank 48 fixed on the rock shaft 33, and the ends of the beam 51 are pivotally connected to links 55 attached to a lateral side extension 56 of the sleeve valves 18 of the units C and D.

From the foregoing, it will be observed that the work cylinders of units C and D are moved in synchronism through the medium of an eccentric 27, crank 24, rock sleeve 23, crank 28, pitmans 30, beam 36, links 39 and extensions 40 of the work cylinders 17. The other pitman 30, through the medium of beam 35, extensions 43, actuate the work cylinders 17 of units A and B.

Since the rock shafts 33 and 34 are actuated by the beams 35 and 36 respectively, it is apparent that the sleeve valves 18 of the units C and D will be actuated through the medium of rock shaft 33, crank 48, link 54, crank 52, beam 57, links 55 and extensions 56. The sleeve valves 18 of the units A and B will be actuated through the medium of rock shaft 34, crank 49, link 50, wrist pin 47, beam 44, links 45 and extensions 46.

The manner of articulating the sleeve valves and the work cylinders relative to the rock sleeves 22 and 23 actuated by the crank shaft 10 causes the work cylinders 17 of the units C and D to be operated in synchronism with the sleeve valves 18 of the units A and B and the work cylinders 17 of the units A and B operated in synchronism with the sleeve valves 18 of the units C and D. With the ported sleeve valves and work cylinders properly positioned in the cylinder casing or block, it is possible to reciprocate the work cylinders and sleeve valves in timed relation so that ports will register at predetermined times, with a maximum port area, for the intake and exhaust of liquids and fluids to and from work cylinders.

It is apparent that eight elements are reciprocated by using two eccentrics and that the gearing not only obviates the necessity of an individual eccentric for each reciprocable element, but insures accuracy in the timed movement of all of said elements.

Figure 10:
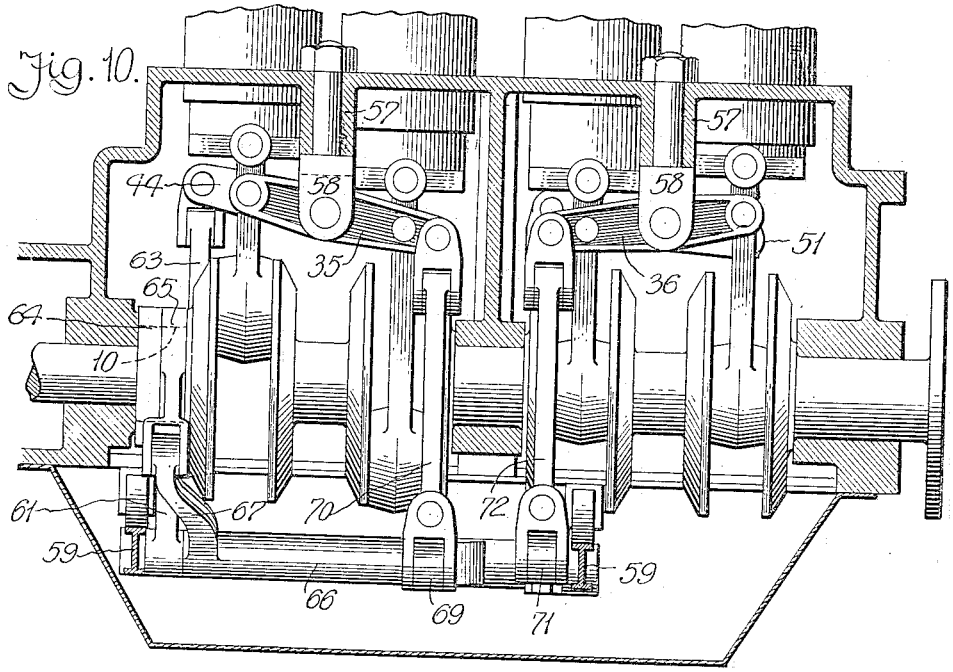
Fig. 10 is a side elevation of the same, and Figure 11:
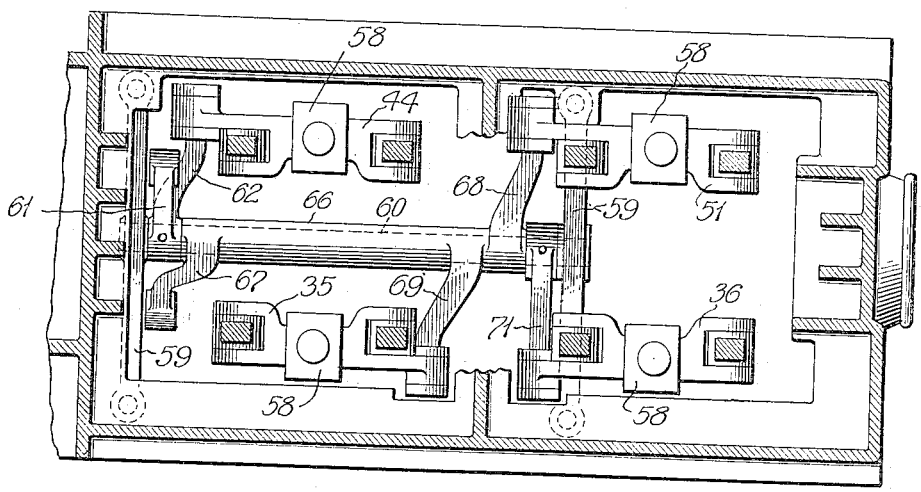
Fig. 11 is a plan of the operating mechanism.

Reference will now be had to Figs. 9, 10 and 11 showing a modified form of operating mechanism which obviates the necessity of using a transverse shaft, for instance the rock shafts 33 and 34 or any other connections transversely of the crank case above the crank shaft. The top of the crank case is provided with bearings or bosses 57 and mounted in these bosses are hangers 58 for the beams 35, 36, 44 and 51 which are articulated with the work cylinders and valve sleeves of the engine.

The bottom of the crank case is provided with transverse bearings 59 for a rock shaft 60 and fixed on one end of said shaft is a bell crank having arms 61 and 62, the latter being connected by a pitman 63 to the beam 44. The arm 61 is connected to an eccentric strap 64 on the crank shaft of the engine and said shaft has another eccentric strap 65 at the side of the eccentric strap 64. The crank shaft of the engine has eccentric portions serving the straps 64 and 65.

Loose on the rock shaft 60 is a rock sleeve 66 having a crank 67 connected to the eccentric strap 65. The rock sleeve 66 also has arms 68 and 69 connected by pitmen 70 to the beams 51 and 35 respectively.

Fixed on the rock shaft 60 at the end of the rock sleeve 66 is an arm 71 connected by a pitman 72 to the beam 36.

What I claim is:—

1. In an engine, a crank shaft, power units A, B, C and D, each including a reciprocable work cylinder and a reciprocable sleeve valve, means actuated by said crank shaft adapted for reciprocating the cylinders of the units C and D, means actuated by the crank shaft adapted for reciprocating the cylinders of units A and B, means utilizing part of the cylinder operating means of units A and B adapted for reciprocating the valves of units C and D, and means utilizing part of the cylinder operating means of units C and D adapted for reciprocating the valves of units A and B.

2. In an internal combustion engine, a crank case, a crank shaft in said crank case, reciprocable work cylinders having side extensions toward one side of said crank case, reciprocable valve sleeves about said work cylinders and having side extensions toward the other side of said crank case, rock sleeves below said crank shaft and operatable thereby, means actuated by said rock sleeves at one side thereof and articulated with extensions of said work cylinders for reciprocating said cylinders, and means operatable at the other side of said crank case from the first mentioned means for reciprocating said valve sleeves.

3. In a multi-cylinder engine, sets of work cylinders, valve sleeves about said cylinders, sets of beams having ends thereof articulated with said cylinders adapted to reciprocate said cylinders, means actuated by said engine adapted to impart movement to said beams, a beam having its ends articulated with some of said sleeves and actuated by one of the first mentioned beams to reciprocate its sleeves, and a beam having its ends articulated with the remaining sleeves and actuated by the other of the first mentioned beams to reciprocate the remaining sleeves.

4. In an internal combustion engine, a plurality of power units each with an inner and an outer valve sleeve, a crank shaft, two actuating means operated from the crank shaft, means actuated by one of said actuating means for imparting movement to the inner sleeves of two units and the outer sleeves of two other units, and means actuated by the other of said actuating means for imparting movement to the outer sleeves of the first mentioned two units and the inner sleeves of the last mentioned two units.

5. In an internal combustion engine, a plurality of power units each with an outer valve sleeve, a crank shaft, a rock shaft under the crank shaft and parallel thereto, rocker beams one on each side of the power units near the ends of the sleeves, connections between one rocker beam and the inner sleeves and between the other rocker beam and the outer sleeves, and means to actuate the rocker beams from the rock shaft.

6. In an internal combustion engine, a plurality of power units each with an inner and an outer valve sleeve, a crank shaft, a rock shaft under the crank shaft and parallel thereto, rocker beams one on each side of the power units near the ends of the sleeves, connections between one rocker beam and the inner sleeves and between the other rocker beam and the outer sleeves, and means to actuate the rocker beams from the rock shaft, including an arm on the rock shaft and a connecting rod extending between the arm and a rocker beam.

In testimony whereof I affix my signature in the presence of two witnesses.

JOHN M. CAGE.

Witnesses:
 KARL H. BUTLER,
 ANNA M. DORR.